United States Patent
Yang et al.

(10) Patent No.: US 10,725,328 B2
(45) Date of Patent: Jul. 28, 2020

(54) TEMPERATURE-CONTROLLED DIMMING FILM WITH A FUNCTION OF SHIELDING NEAR-INFRARED LIGHT AND PREPARATION METHOD THEREOF

(71) Applicant: PEKING UNIVERSITY, Beijing (CN)

(72) Inventors: Huai Yang, Beijing (CN); Xiao Liang, Beijing (CN); Mei Chen, Beijing (CN); Shumeng Guo, Beijing (CN); Lanying Zhang, Beijing (CN); Cuihong Zhang, Beijing (CN); Qian Wang, Beijing (CN); Chenyue Li, Beijing (CN); Cheng Zou, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 16/466,457

(22) PCT Filed: Jun. 29, 2017

(86) PCT No.: PCT/CN2017/090825
§ 371 (c)(1),
(2) Date: Jun. 4, 2019

(87) PCT Pub. No.: WO2018/107724
PCT Pub. Date: Jun. 21, 2018

(65) Prior Publication Data
US 2019/0310499 A1    Oct. 10, 2019

(30) Foreign Application Priority Data

Dec. 16, 2016    (CN) .......................... 2016 1 11652775

(51) Int. Cl.
*G02F 1/1334*    (2006.01)
*C09K 19/54*    (2006.01)
(Continued)

(52) U.S. Cl.
CPC .......... *G02F 1/1334* (2013.01); *C09K 19/544* (2013.01); *G02F 1/132* (2013.01);
(Continued)

(58) Field of Classification Search
None
See application file for complete search history.

(56) References Cited

U.S. PATENT DOCUMENTS 8,284,336 B2    10/2012   Powers et al.
8,643,795 B2    2/2014    Mccarthy et al.
(Continued)

FOREIGN PATENT DOCUMENTS

CN    102460238    5/2012
CN    105295311    2/2016
(Continued)

OTHER PUBLICATIONS

"Preparation and thermo-optical characteristics of a smart polymer-stabilized liquid crystal thin film based on smectic A-chiral nematic phase transition," Jian Sun et al., 2014 Smart Mater. Struct. 23, 125038 (published Nov. 12, 2014. (Year: 2014).*
(Continued)

*Primary Examiner* — Ryan Crockett
(74) *Attorney, Agent, or Firm* — Greenblum & Bernstein, P.L.C.

(57) ABSTRACT

The present invention relates to a temperature-controlled dimming film with a function of shielding near-infrared light, which comprises a polymer network skeleton and liquid crystal molecules, wherein the polymer network skeleton consists of a polymer-dispersed liquid crystal network structure and a polymer-stabilized liquid crystal network structure and comprises a polymer matrix with pores inside which polymer networks are vertically aligned; and the liquid crystal molecules are dispersed in the polymer net-
(Continued)

work skeleton and have smectic (SmA)-cholesteric (N*) phase transition. Between the skeleton and the liquid crystal molecules, nanoparticles, having absorption at 800-3000 nm, are dispersed. In the invention, a stepwise polymerization method is utilized to construct a PD&SLC network structure between two substrates, which greatly improve the bonding strength between the two substrates and the heat insulation performance of the temperature-controlled liquid crystal dimming film.

10 Claims, 4 Drawing Sheets (51) Int. Cl.
G02F 1/13 (2006.01)
G02F 1/1333 (2006.01)
C09K 19/52 (2006.01)

(52) U.S. Cl.
CPC .......... *G02F 1/1313* (2013.01); *G02F 1/1333* (2013.01); *C09K 2019/521* (2013.01); *C09K 2019/548* (2013.01); *G02F 2001/13345* (2013.01)

(56) References Cited

U.S. PATENT DOCUMENTS

| 9,535,271 | B2 | 1/2017 | Junge et al. | |
|---|---|---|---|---|
| 2010/0045924 | A1* | 2/2010 | Powers | G02B 5/23 349/190 |
| 2010/0259698 | A1* | 10/2010 | Powers | C09K 19/02 349/20 |
| 2011/0025934 | A1* | 2/2011 | McCarthy | G02F 1/132 349/20 |
| 2013/0033738 | A1 | 2/2013 | Powers et al. | |
| 2013/0092888 | A1* | 4/2013 | Honda | G02B 5/00 252/583 |
| 2014/0320776 | A1* | 10/2014 | Taheri | C09K 19/586 349/16 |
| 2014/0333985 | A1* | 11/2014 | Junge | G02F 1/0147 359/288 |
| 2015/0362627 | A1* | 12/2015 | Yang | G02B 1/04 252/587 |
| 2019/0185746 | A1* | 6/2019 | Song | C09K 19/60 |

FOREIGN PATENT DOCUMENTS

| CN | 105334677 | 2/2016 |
|---|---|---|
| CN | 105572946 | 5/2016 |
| CN | 106773239 | 5/2017 |
| CN | 104011584 | 5/2018 |

OTHER PUBLICATIONS

Jian Sun et al., "Preparation and thermo-optical characteristics of a smart polymer-stabilized liquid crystal thin film based on smectic A-chiral nematic phase transition", Smart Materials and Structures, Nov. 12, 2014, vol. 23, pp. 125038-125047.

Xiao Liang et al., "A temperature and electric field-responsive flexible smart film with full broadband optical modulation", Materials Horizons, Jun. 21, 2017, vol. 4, pp. 878-884.

Office Action issued in China Counterpart Patent Appl. No. 201611165277.5, dated Mar. 26, 2019.

International Search Report issued in International Patent Application No. PCT/CN2017/090825, dated Oct. 11, 2017.

* cited by examiner

TEMPERATURE-CONTROLLED DIMMING FILM WITH A FUNCTION OF SHIELDING NEAR-INFRARED LIGHT AND PREPARATION METHOD THEREOF

RELATED APPLICATION

The invention relates to and includes by reference Chinese patent application CN201611165277.5, which was filed on Dec. 16, 2016 and titled as 'Temperature-controlled dimming film with a function of shielding near-infrared light and preparation method thereof', and requires to enjoy the priority right of the above Chinese patent application.

TECHNICAL FIELD

The invention belongs to the field of functional liquid crystal material technology application, and particularly relates to a temperature-controlled dimming film with a function of shielding near-infrared light and a preparation method thereof.

BACKGROUND ART

Energy is a basic industry of national economy and plays an important role in ensuring sustainable and stable development of economy and improvement of people's life quality. Since the beginning of the $21^{st}$ century, economic society has been developed rapidly; science and technology have been innovated every day; the global population and economy have been growing constantly; and energy has been used more widely as the most fundamental driving power. As the anticipation of global depletion of non-renewable energy resources has been strengthened, the contradiction between energy supply and demand appeared. As is well known, industrial energy consumption, transportation energy consumption and building energy consumption are the three major components of global energy consumption. In particular, building energy consumption has been increased rapidly due to the continuous expanding of the total construction volume and the improvement of living comfort. Numerous studies have shown that solar radiation directly entering the room from the window is the main cause of indoor overheating in summer. About 29% of the energy in high-rise buildings comes from the radiant energy of sunlight. In hot climates, this figure can be close to 40%.

Intelligent and controllable sunshade film is an important development direction in the field of energy-saving building materials. Among them, the intelligent and temperature-controlled liquid crystal dimming film has the characteristic of automatically adjusting its light transmittance according to external temperature change, that is, when the weather is cold, the film is transparent, which does not affect indoor lighting and heating; when the weather is hot, the film automatically becomes into a light scattering state, which can shield most of the radiant energy of visible light and prevent indoor people's eyes from receiving strong sunlight. Also, the higher polymer content inside the film endows the film with a good bond strength, which is convenient for large-scale processing. Therefore, the intelligent and temperature-controlled liquid crystal dimming film has a good application prospect in the building energy-saving field.

Among the radiant energy of sunlight, visible light accounts for about 47%; whereas near-infrared light accounts for nearly 50%. Therefore, in order to further improve the thermal insulation performance of the intelligent and temperature-controlled liquid crystal dimming film, it is necessary to improve the film's capacity of absorbing near-infrared light.

SUMMARY OF THE INVENTION

An object of the present invention is to provide a temperature-controlled dimming film with a function of shielding near-infrared light, which has good transmittance and near-infrared light shielding effect at low temperatures, and automatically becomes into a light scattering state and simultaneously shields 90% of near-infrared light at high temperatures.

Another object of the present invention is to provide a method for preparing the temperature-controlled dimming film as above.

The invention provides a temperature-controlled dimming film with a function of shielding near-infrared light, which comprises a polymer network skeleton and liquid crystal molecules, wherein the polymer network skeleton consists of a polymer-dispersed liquid crystal network structure and a polymer-stabilized liquid crystal network structure and comprises a polymer matrix with pores inside which polymer networks are vertically aligned; and the liquid crystal molecules are dispersed in the polymer network skeleton and have smectic (SmA)-cholesteric (N*) phase transition. Between the skeleton and the liquid crystal molecules, nanoparticles, having absorption at 800-3000 nm, are dispersed.

As a preferred embodiment of the technical solution above, the polymer network skeleton is prepared from polymerizable monomers through stepwise polymerization. The stepwise polymerization and the ultraviolet stepwise polymerization as mentioned below mean that the polymerizable monomers are polymerized in a controlled manner in the system, which include ultraviolet-initiated pre-polymerization and electrified polymerization under the combined action of ultraviolet light and electric field. The first ultraviolet-initiated polymerization enables polymerization between 10%~90% of the non-liquid crystal polymerizable monomers and 0.1%~90% of the liquid crystal polymerizable monomers in the system, so as to form a substrate with a certain viscosity and a preliminary polymer matrix with pores. Afterwards, under the combined action of ultraviolet light and electric field, polymerization occurs inside the pores to form polymer networks which clearly are vertically oriented. According to different utilization (such as rigidity and flexibility and product characteristics requirements), the stepwise polymerization may be controlled by controlling the degree of the first ultraviolet-initiated polymerization. The control can be achieved by choosing either extending or shortening the ultraviolet radiation period. For example, the first ultraviolet radiation period is chosen within 10-600 s. In order to obtain products with different preliminary polymerization degrees, the optional first ultraviolet radiation period may be 10-30 s, 30-60 s, 60-120 s, 100-200 s, 200-400 s, 400-600 s. By controlling the first ultraviolet radiation period, such a preliminary polymerization product that, the non-liquid crystal polymerizable monomer has a polymerization degree (monomer reaction ratio) of 10-20%, 20-30%, 30-50%, 50-60%, 60-70%, 70-90% and the liquid crystal polymerizable monomer has a polymerization degree (monomer reaction ratio) of 0.1-10%, 10-20%, 20-40%, 40-60%, 60-70%, 70-90%, can be obtained. In Examples of the present invention, the methods of controlling the ultraviolet radiation period were used to control the stepwise polymerization. However it is known by those skilled in the art that other methods that can control polymerization progress may also be used to carry out the present invention.

As a preferred embodiment of the technical solution above, the polymer matrix has a pore size of 1 um~100 um, which may be adjusted as needed. Based on common knowledge, the vertically oriented polymer network prepared according to the method of the present invention may also be changed by controlling the pore size. The pore size can be chosen from various ranges such as 1-10, 10-20, 20-40, 40-60, 60-80, 80-100 micron. Subject to the pore size, the corresponding vertically oriented polymer network will also be reduced into a smaller size.

As a preferred embodiment of the technical solution above, the liquid crystal material, the polymerizable monomers, and the nanoparticles in the raw materials to prepare the dimming temperature-controlled dimming film are in a ratio by weight shown as below:

liquid crystal material: 10.0~90.0 parts by weight;
polymerizable monomers: 10.0~80.0 parts by weight;
nanoparticles: 1.0 to 30.0 parts by weight.

As a preferred embodiment of the technical solution above, the liquid crystal material is a liquid crystal material having SmA~N* phase transition and its phase transition temperature is −10° C. or higher.

As a preferred embodiment of the technical solution above, the liquid crystal material comprises one or more selected from a liquid crystal material having smectic phase, a liquid crystal material having nematic phase, and a chiral compound. The liquid crystal monomers of the liquid crystal material include, but not limited to, one or more selected from the following molecules:

wherein each of M and N is an alkyl group having 1=16 carbon atoms, an alkoxy group having 1~16 carbon atoms, a siloxane group having 1~16 atoms, a cyano group, an ester group, Halogen, an isothiocyanato group, or a nitro group; each of A and B is an aromatic ring (such as 1,4-benzene ring, 2-5-pyrimidine ring, 1,2,6-naphthalene ring), or aliphatic naphthene (such as trans-1,4-cyclohexane); wherein each of A and B may contain a pendant group, i.e. halogen, a cyano group, or a methyl group; wherein each of x and y is 0=4; wherein Z is an ester group, alkynyl, or alkane; or A and B linked directly; or a nitrogen-nitrogen double bond, or an ether bond.

The nematic liquid crystal material may also be selected from, but not limited to, commercially available liquid crystal materials, such as SLC-1717, SLC-7011, TEB30A etc. of Yongsheng Huaqing Liquid Crystal Material Co., Ltd., or E7, E44, E48 ZLI-1275, etc. of Merck Liquid Crystal Materials Co., Germany.

The chiral compound includes, but not limited to, one or more of the following molecules, such as cholesteryl nonanoate, CB15, C15, 5811, R811, S1011, R1011, and the like.

As a preferred embodiment of the technical solution above, the nanoparticles comprise one or more selected from indium tin oxide (ITO), antimony tin oxide (ATO), tungsten trioxide ($WO_3$), molybdenum trioxide ($MoO_3$), tungsten bronze (alkali metal-doped $WO_3$) or copper sulfide (CuS) with oxygen defects.

As a further preferred embodiment of the technical solution above, the liquid crystal material comprises a liquid crystal composition which comprises a first component, and one or more selected from a second component, a third component, a fourth component, and a fifth component. The first component is one or more liquid crystal compound(s) selected from either one of the following Group A and Group B, or a mixture comprising one or more of Group A and one or more of Group B. Group A represents liquid crystal compounds shown as Formula (1-a); and Group B represents liquid crystal compounds shown as Formula (1-b), wherein $R_a$ is an alkyl group having 8~12 carbons atoms, and $R_b$ is an alkyl group having 8~10 carbon atoms;

(1-a)

(1-b)

The second component is one or more liquid crystal compound(s) selected from either one of Group C or Group D, or a mixture of one or more of Group C and one or more of Group D; wherein $R_c$ is an alkyl group having 6~7 carbon atoms, $R_d$ is an alkyl group having 5~7 carbon atoms. Group C represents liquid crystal compounds shown as Formula (2-c); and Group D represents liquid crystal compounds shown as Formula (2-d).

(2-c)

(2-d)

The third component is a liquid crystal compound shown as Formula (3); wherein $R_3$ is an alkyl group having 5~7 carbon atoms;

(3)

The fourth component is one or more liquid crystal compound(s) selected from any one of Group E, Group F and Group G, or a mixture of one or more of Group E, one or more of Group F, and one or more of Groups G; wherein $R_4$ is an alkyl Group having 5~7 carbon atoms. Group E represents liquid crystal compounds shown as Formula (4-e); Group F represents liquid crystal compounds shown as Formula (4-f); and Group G represents liquid crystal compounds shown as Formula (4-g);

(4-e)

(4-f)

(4-g)

The fifth component is chiral compounds having the same chiral configuration.

As a further preferred embodiment of the technical solution above, the liquid crystal composition comprises 15%~40% of the first component, 35%~60% of the second component, 1%~10% of the third component, 5%~25% of the fourth component and 1%~20% of the fifth component.

As a further preferred embodiment of the technical solution above, the liquid crystal composition comprises the compounds shown as Formula (1-a), Formula (1-b), Formula (2-c), Formula (2-d), Formula (3), and Formula (4-e), Formula (4-f), Formula (4-g), and the fifth component.

As a further preferred embodiment of the technical solution above, the liquid crystal compound shown as Formula (1-a) has a mass fraction of 15%~40%; the liquid crystal compound shown as Formula (1-b) has a mass fraction of 0%~8%; the liquid crystal compound shown as Formula (2-c) has a mass fraction of 16%~45%; the liquid crystal compound shown as Formula (2-d) has a mass fraction of 15%~28%; the liquid crystal compound shown as Formula (3) has a mass fraction of 1%~10%; the liquid crystal compound shown as Formula (4-e) has a mass fraction of 5%~25%; the liquid crystal compound shown as Formula (4-f) has a mass fraction of 0%~6%; and liquid crystal compound shown as Formula (4-g) has a mass fraction of 0%~5%, and the fifth component has a mass fraction of 1%~20%.

As a preferred embodiment of the technical solution above, the polymerizable monomers used in the present invention are ultraviolet-polymerizable monomers, including non-liquid crystal ultraviolet-polymerizable monomers and liquid crystal ultraviolet-polymerizable monomers. The non-liquid crystal ultraviolet-polymerizable monomers can be selected from, but not limited to, one or more of the followings, such as unsaturated polyester, epoxy acrylate, urethane acrylate, polyester acrylate, epoxy acrylate, a polyene mercaptan system, polyether acrylate, aqueous acrylate, vinyl ethers, and the like. The liquid crystal ultraviolet-polymerizable monomers can also be selected from, but not limited to, one or more of the following molecules, such as wherein m and n represent 4~8, x and y represent 1~2, and E and Q represent acrylate, epoxy acrylate, urethane acrylate, or epoxy or polyene mercaptan.

As a preferred embodiment of the technical solution above, the nanoparticles are grafted with surfactant on their surfaces.

As a preferred embodiment of the technical solution above, the temperature-controlled dimming film can shield 80% or more of near-infrared light and has a transmittance higher than 75% in visible light waveband while existing at a temperature lower than the phase transition temperature of the liquid crystal, and has a transmittance lower than 10% in both the visible and near-infrared light wavebands while existing at a temperature higher than the phase transition temperature of the liquid crystal.

The invention also provides a method for preparing the temperature-controlled dimming film, which comprises the steps of:

mixing liquid crystal material, polymerizable monomers, an initiator, and spacer particles to obtain a uniform mixture; adding the mixture into a solution containing nanoparticles and mixing it evenly; then removing the solvent and placing the obtained liquid between conductive films; allowing an incomplete polymerization reaction between the non-liquid crystal polymerizable monomers and the liquid crystal polymerizable monomers in the system; and then polymerizing the remaining polymerizable monomers by applying an electric field to the conductive films, so as to generate the temperature-controlled dimming film.

As a preferred embodiment of the technical solution above, polymerization between parts of the non-liquid crystal photopolymerizable monomers are a small portion of the liquid crystal photopolymerizable monomers is induced by ultraviolet.

As a preferred embodiment of the technical solution above, the surfactant is grafted on the surfaces of the nanoparticles by a microemulsion method, a reversed-phase microemulsion method or a surfactant method.

In Examples of the present invention, the temperature-controlled dimming film was prepared by the following typical method.

Step 1. A liquid crystal material having a suitable temperature range and phase transition temperature was selected.

Step 2. The nanoparticles were placed into a certain amount of solvent such as acetone or ethanol, etc. (about 1 mL of solvent per 4 mg of nanoparticles), and dispersed thoroughly in the solvent by ultrasonic for about 30 minutes.

Step 3. The liquid crystal of Step 1, polymerizable monomers, spacer particles, and an accelerator/initiator were mixed evenly. Afterwards, the nanoparticle dispersion of Step 2 was added to the mixture system in a certain ratio. The solvent in the nanoparticle dispersion was removed by heating or distillation or the like. As a result, a dispersion of the nanoparticles in the mixture system was obtained.

Step 4. The dispersion of the nanoparticles in the mixture system obtained in Step 3 was placed between the two conductive films and extruded into a film. At first, the polymerizable monomers in the system were partially polymerized, and then, as an electric field was applied to the film, the remaining polymerizable monomers were polymerized completely. As a result, a temperature-controlled dimming film with a function of shielding near-infrared light was prepared.

The nanoparticles, before being used, need to be dispersed thoroughly in a solvent first. When doped in an amount less than 5.0%, the nanoparticles can be dispersed by an ultrasonic method. If a better dispersion effect is desired, the nanoparticles, before being used, need to be surface-modified by chemical bonding or physical coating of a layer of organic (or inorganic) compounds on their surfaces, so as to reduce the agglomeration of the nanoparticles and improve their dispersibility in the liquid crystal/polymerizable monomer system. Specific surface modification methods include a microemulsion method, a reversed-phase microemulsion method, a microcapsule method, a coupling agent method, a surfactant method, a ligand exchange method, and the like. After the surface modification, the nanoparticles used in the present invention still have good dispersibility even when its content reaches 30% in the mixture system.

In the invention, a stepwise ultraviolet-polymerization method is utilized to construct a polymer-dispersed and polymer-stabilized liquid crystal system (PD&SLC), in which a polymer-dispersed liquid crystal (PDLC) is combined with a polymer-stabilized liquid crystal (PSLC), inside the film. As a result, the bonding strength between the two films is improved greatly and the temperature-controlled dimming film is thinned. At the same time, the nanoparticles with strong shielding effect in the near-infrared waveband of 800 nm~3000 nm are surface-modified and then doped at a certain ratio into the temperature-controlled liquid crystal dimming film, which greatly improves the film's shield performance in the near-infrared waveband. The film prepared as above, while exiting at a temperature lower than the phase transition temperature of the liquid crystal, shields 80% or more of near-infrared light and allows most of the visible light passing through; whereas, while existing at a temperature higher than the phase transition temperature of the liquid crystal, has an infrared light shielding rate up to 90% or higher and allows most visible light passing through in the form of scattered light, so as to ensure a good transmittance for visible light, but also prevent the indoor people's eyes from being irritated by strong sunlight. In addition, by selecting a suitable surface modifier, the nanoparticles have good dispersibility in the liquid crystal/polymer composite material. When the film is at a low temperature, the transmittance of visible light can exceed 75%. In other words, when the film is transparent, the doped nanoparticles do not affect the transmission of visible light.

SPECIFIC MODES FOR CARRYING OUT THE INVENTION

The following are Examples of the invention, which are merely illustrative of but not limiting the invention.

In the following Examples, the degree of preliminary polymerization may be controlled by other methods, and the difference in the polymerization degree endows the products with different properties, so that products may be prepared for different uses.

In the following Examples, the selected liquid crystal material (LC) having smectic phase (SmA) to cholesteric phase (N*) transition was a liquid crystal material which had adjustable transition temperature and its phase transition temperature was SmA-35° C.-N*-80° C.-I, i.e., when the external temperature was lower than 35° C., the film was in a transparent state; whereas, when the film was at a temperature higher than 35° C., it was in a light scattering state. Various commercially available materials satisfying the foregoing requirements can be used in the present invention. Those skilled in the art may also choose the compounds from those selected in the Summary of the Invention or a combination thereof. Unless indicated otherwise, the following Examples were carried out at room temperature of 25° C. The names and structural formulas of the polymerizable monomers and initiators used in Examples 1 and 2 are shown in Table 1 and 2. The ratios of the components in the polymerizable monomers are shown in Table 1.

TABLE 1

Ratios of the components in the polymerizable monomers used in Examples 1 and 2

| Name | Ratio/% |
|---|---|
| HPMA | 45.6 |
| LMA | 30.4 |
| Bis-EMA15 | 11.4 |
| PEGDA600 | 7.6 |
| C6M | 5.0 | wherein, HMPA (Hydroxypropyl methacrylate) structure is

LMA (Lauryl methacrylate) is

PEDGA600 (Polyethylene glycol diacrylate) is

Bis-EMA15 (Bisphenol a ethoxylate dimethacrylate) is

C6M(2-methyl-1,4-phenylene-bis (4-((6-acryloyloxy) hexyl)oxy)benzoate) is and the initiator C6I(2,2-dimethoxy-1,2-diphenylethan-1-one) used is Example 1

Figure 1:
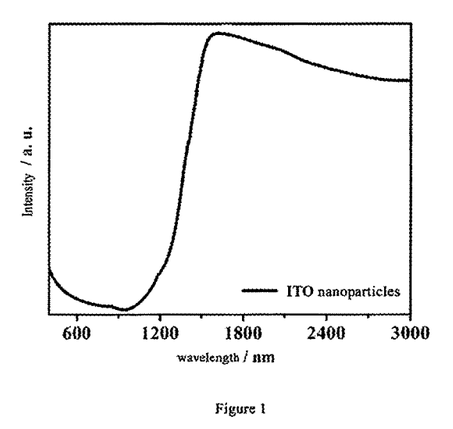
FIG. 1 demonstrates a near-infrared light absorption spectrum of the nanoparticles used in Example 1.

The nanoparticles used in this Example were ITO nanoparticles, which were purchased from Shanghai Huzheng Nano Technology Co., Ltd. Its absorption spectrum in the near-infrared waveband is shown as FIG. 1. Those skilled in the art may also choose other nanoparticles which have been reported in the prior art to use in the present invention. For example, CN105219091A disclosed copper sulfide nanoparticles, and CN103724854B disclosed an infrared absorption material, both of which can be used to prepare the film of the present invention.

Step One:

First, 1.0 g of the above ITO nanoparticles were added to a certain amount of ethanol solvent and sonicated for 10 min. Subsequently, 0.05 g of the surfactant 3-(methacryloyloxy)propyltrimethoxysilane, shortened as KH570, was added to the dispersion of ITO nanoparticles in ethanol. After the dispersion was heated to 60° C., 0.075 g of aqueous ammonia with a mass fraction of 20.0% was added dropwise while being stirred continuously. The reaction period was 12 hours. The modified nano-ion was then separated by centrifugation, and added again to 250.0 mL of ethanol solution, and dispersed by ultrasonic for 30 minutes, for later use.

Step Two:

The names and ratios of the selected liquid crystals, polymerizable monomers, initiator, and spacer particles are listed in Table 2. The components in Table 2 were mixed according to their ratios, and stirred at room temperature to form isotropic liquid. The isotropic liquid was mixed evenly. And the total mass of the mixture was 19 g.

TABLE 2

Ratio of each material used in Example 1.

| Name | Ratio/% |
| --- | --- |
| Liquid crystal material | 63.2 |
| Polymerizable monomers | 35.8 |
| Initiator | 0.5 |
| 20-micron spacer particles | 0.5 |

Step Three:

The nanoparticle dispersion obtained in Step one was added to the mixture of Step two, and sonicated again for 10 minutes to disperse the nanoparticles evenly. The dispersion was then incubated at 80° C. for 24 h to completely remove the ethanol solution. As a result, a dispersion of ITO nanoparticles in the mixture system was obtained.

Figure 2:
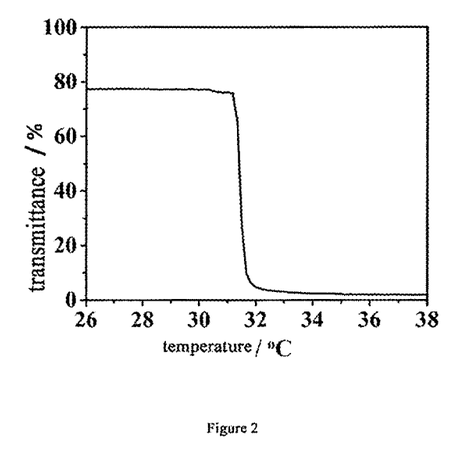
FIG. 2 is a curve graph showing the transmittance of the film prepared in Example 1 as a function of temperature.
Figure 3:
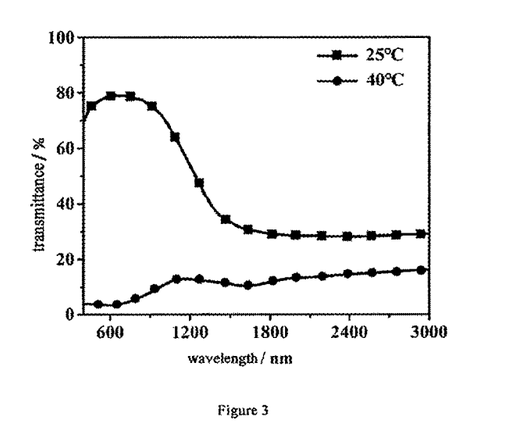
FIG. 3 demonstrates a visible-near-infrared spectrum of the film prepared in Example 1.

Step Four:

The dispersion of ITO nanoparticles in the mixture system obtained above was applied between two plastic films coated with indium tin oxide (ITO) transparent conductive films, and rolled to form a film. The film was irradiated at room temperature by ultraviolet light having a wavelength of 365 nm and an intensity of 0.5 mw/cm² for 90 s. Then, the film was fabricated with electrodes; a voltage of 50.0 Hz, 170 v was applied; and the irradiation by 365 nm ultraviolet light was continued to obtain the temperature-controlled dimming film. A temperature-variable ultraviolet-visible-near-infrared spectrophotometer was used to measure the light transmittance, when the film was kept at room temperature and at 40° C. respectively, the external light intensity was 1.5 mw/cm², and the irradiation period was 10 min. Therefore, a curve graph showing the transmittance of the film with a function of shielding near-infrared light prepared in Example 1 as a function of wavelength was obtained, as shown in FIG. 2. The test wavelength range was from 400 nm to 3000 nm.

Example 2

Step One:

Synthesis of ITO Nanoparticles: 300 mg of indium acetylacetonate and 30 mg of acetylacetonate tin chloride were weighed in a round bottom flask, and 17 mL of octadecene solvent was added, followed by being stirred evenly. Subsequently, under the protection of inert gas, the mixture was heated to 250° C. and kept at this temperature for 30 min. Then 1 mL of oleic acid was added, and the solution was heated immediately to 270° C. and kept at this temperature for 1 hour. Subsequently, 3 mL of oleylamine was added, and the solution was immediately heated to 290° C. and kept at this temperature for 1 hour. After the reaction was completed and the temperature of the solution was dropped to room temperature, 30 mL of isopropyl alcohol was added to flocculate the nanoparticles. The nanoparticles were separated by centrifugation; then the prepared oleylamine oleic acid-coated ITO nanoparticles were re-dispersed in 20.0 mL of cyclohexane solvent.

Step Two

Figure 5:
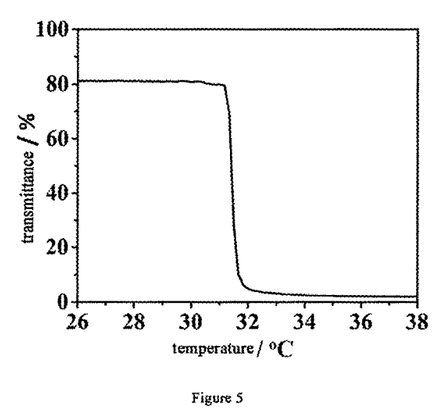
FIG. 5 is a curve graph showing the transmittance of the film prepared in Example 2 as a function of temperature.
Figure 6:
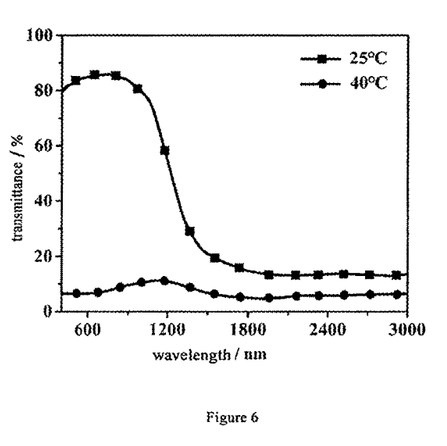
FIG. 6 demonstrates a visible-near-infrared spectrum of the film prepared in Example 2.
Figure 7:
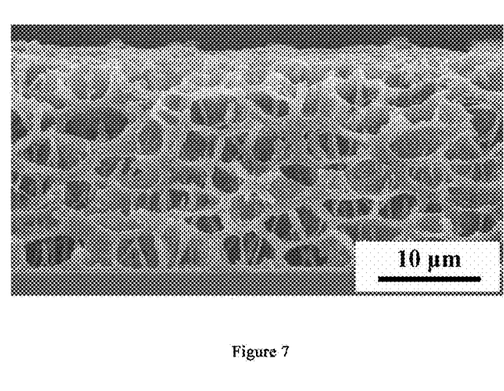
FIG. 7 shows a Scanning Electron Microscope image of the cross section of the film prepared in Example 2.

Surface modification of ITO nanoparticles: Due to the good conductivity, if ITO nanoparticles are added in a large amount, the electrodes are easily ablated when a voltage is applied to the film. Therefore, in this Example, the ITO nanoparticles were coated with a layer of silicon dioxide, which had no impact on the near-infrared absorption characteristics of the ITO nanoparticles, but insulated the nanoparticles from each other, so as to avoid ablation of the electrodes during power-up. The specific process was shown as follows: 2,3-nonylphenol polyether was added to 20 mL of cyclohexane solvent obtained in Step one, to construct a reversed-phase microemulsion system. Subsequently, 0.2 mL of tetraethyl orthosilicate was added and stirred at room temperature for 15 min; then 0.3 mL of aqueous ammonia with a mass fraction of 20% was added dropwise and stirred constantly. The reaction lasted 24 h at room temperature. Afterwards, 0.2 mL of KH570 was added and stirred constantly at room temperature for 12 h. As a result, ITO-SiO₂ nanoparticles modified by KH570 were prepared. The nanoparticles, after separated by centrifugation, were re-dispersed in 20 mL of ethanol solution for later use. FIG. 5 shows the absorption spectrum of the nanoparticles in the near-infrared region.

Step Three:

The names and ratios of the selected liquid crystals, polymerizable monomers, initiator, and spacer particles are listed in Table 3. The components in Table 3 were mixed according to their ratios, and stirred at room temperature to form isotropic liquid. The isotropic liquid was mixed evenly. And the total mass of the mixture was 900 mg.

TABLE 3

| Ratio of each material used in Example 2 | |
| --- | --- |
| Name | Ratio/% |
| Liquid crystal material | 61.10 |
| Polymerizable monomers | 37.80 |
| Initiator | 0.55 |
| 20 um spacer particles | 0.55 |

Step Four:

The nanoparticle dispersion obtained in Step two was added to the mixture of Step three, and sonicated again for 10 minutes to disperse the nanoparticles evenly. The dispersion was then incubated at 80° C. for 24 h to completely remove the ethanol solution. As a result, a dispersion of ITO nanoparticles in the mixture system was obtained.

Figure 4:
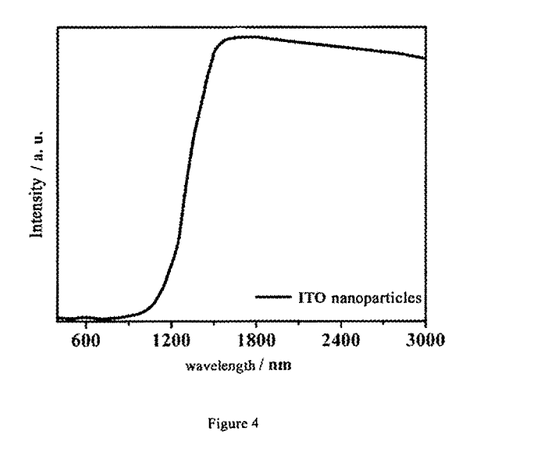
FIG. 4 demonstrates a near-infrared light absorption spectrum of the nanoparticles prepared in Example 2.

Step Five:

The dispersion of ITO nanoparticles in the mixture system obtained above was applied between two plastic films coated with indium tin oxide (ITO) transparent conductive films, and rolled to form a film. The film was irradiated at room temperature by ultraviolet light having a wavelength of 365 nm and an intensity of 0.5 mw/cm² for 90 s. Then, the film was fabricated with electrodes; a voltage of 50.0 Hz, 170 v was applied; and irradiation by ultraviolet light having a wavelength of 365 nm and an intensity of 1.5 mw/cm² was continued for 10 min. As a result, the intelligent temperature-controlled dimming film with a function of shielding near-infrared light of Example 2 was obtained. A temperature-variable ultraviolet-visible-near-infrared spectrophotometer was used to test the curve graph of transmittance as a function of wavelength, when the film was at room temperature and at 40° C. respectively, as shown in FIG. 4. The test wavelength range was from 400 nm to 3000 nm. Using scanning electron microscopy, the network morphology of the cross section of the film was observed, which clearly showed that a vertically oriented polymer network structure was formed inside the porous PDLC network structure (as shown in FIG. 5). Finally, it should be noted that the above Examples are merely illustrative of, but not limiting the technical solutions of the present invention. While the present invention has been described in details with reference to the Examples of the present invention, it should be understood by those skilled in the art that modification or equivalent substitution of the technical solutions of the present invention are not intended to deviate apart from the spirit and scope of the present invention, and should be included within the scope of the Claims.

The invention claimed is:

1. A temperature-controlled dimming film with a function of shielding near-infrared light, characterized in that
said dimming film comprises a polymer network skeleton and liquid crystal molecules, wherein the polymer network skeleton consists of a polymer-dispersed liquid crystal network structure and a polymer-stabilized liquid crystal network structure and comprises a polymer matrix with pores inside which polymer networks are vertically aligned; and the liquid crystal molecules are dispersed in the polymer network skeleton and have smectic-cholesteric phase transition; between the skeleton and the liquid crystal molecules, nanoparticles, having absorption at 800-3000 nm, are dispersed.

2. The temperature-controlled dimming film according to claim 1, wherein the polymer network skeleton is prepared from polymerizable monomers by stepwise polymerization.

3. The temperature-controlled dimming film according to claim 1, wherein the liquid crystal material, the polymerizable monomers, and the nanoparticles are at a ratio by weight of:
liquid crystal material: 10.0~90.0 parts by weight;
polymerizable monomers: 10.0~80.0 parts by weight;
nanoparticles: 1.0 to 30.0 parts by weight;
in the raw materials to prepare the dimming temperature-controlled dimming film.

4. The temperature-controlled dimming film according to claim 1, wherein the nanoparticles comprise one or more selected from indium tin oxide, antimony tin oxide, tungsten trioxide, molybdenum trioxide, tungsten bronze or copper sulfide with oxygen defects.

5. The temperature-controlled dimming film according to claim 1, wherein the liquid crystal material is a liquid crystal material having SmA~N* phase transition and its phase transition temperature is −10° C. or higher.

6. The temperature-controlled dimming film according to claim 3, wherein the polymerizable monomers are ultraviolet-polymerizable monomers, comprising non-liquid crystal ultraviolet-polymerizable monomers and liquid crystal ultraviolet-polymerizable monomers.

7. The temperature-controlled dimming film according to claim 1, wherein the nanoparticles are grafted with surfactant on their surfaces.

8. The temperature-controlled dimming film according to claim 1, wherein the temperature-controlled dimming film shields 80% or more of near-infrared light and has a transmittance higher than 75% in visible light waveband while existing at a temperature lower than the phase transition temperature of the liquid crystal, and has a transmittance lower than 10% in both the visible and near-infrared light wavebands while existing at a temperature higher than the phase transition temperature of the liquid crystal.

9. A method for preparing the temperature-controlled dimming film according to claim 1, comprising:
mixing liquid crystal material, polymerizable monomers, an initiator, and spacer particles to obtain a uniform mixture; adding the mixture into a solution containing nanoparticles and mixing it evenly; then removing the solvent and placing the obtained liquid between conductive films; allowing an incomplete polymerization reaction between the non-liquid crystal polymerizable monomers and the liquid crystal polymerizable monomers in the system; and then polymerizing the remaining polymerizable monomers by applying an electric field to the conductive films, so as to generate the temperature-controlled dimming film.

10. The temperature-controlled dimming film prepared according to claim 9, wherein the surfactant is grafted on the surfaces of the nanoparticles by a microemulsion method, a reversed-phase microemulsion method or a surfactant method.

* * * * *